Sept. 30, 1924.  1,509,968
F. J. MACK
VISIBLE SIGNAL FOR MOTOR VEHICLES
Filed May 4, 1922  2 Sheets-Sheet 1
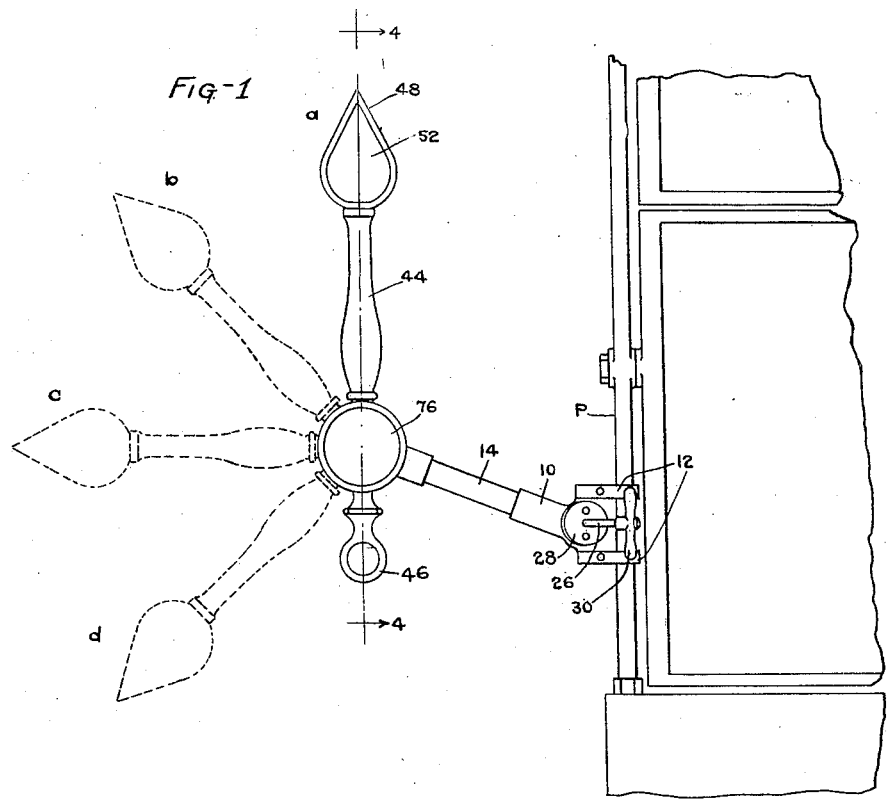
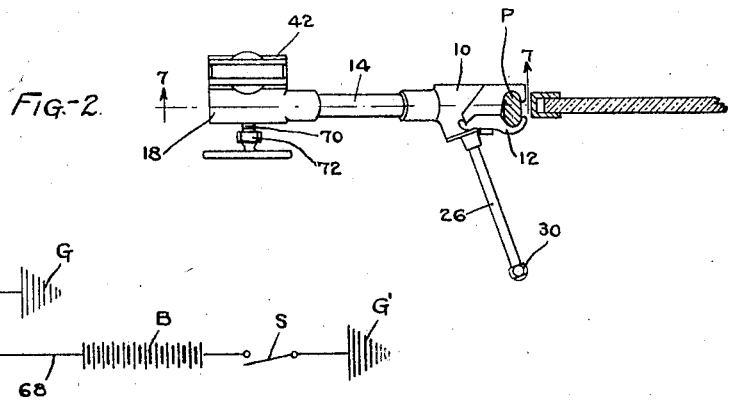
INVENTOR:
FRANK J. MACK.
BY Whiteley and Ruckman
ATTORNEYS.

Sept. 30, 1924.
F. J. MACK
1,509,968
VISIBLE SIGNAL FOR MOTOR VEHICLES
Filed May 4, 1922  2 Sheets-Sheet 2
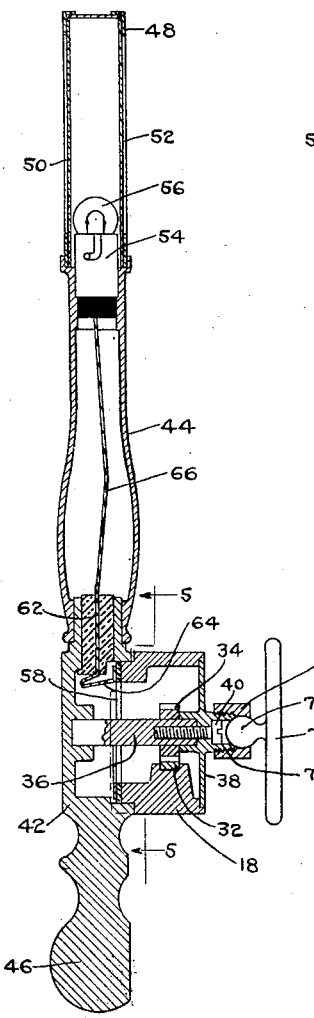
FIG-4.
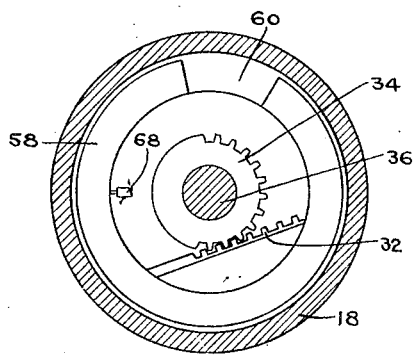
FIG-5.
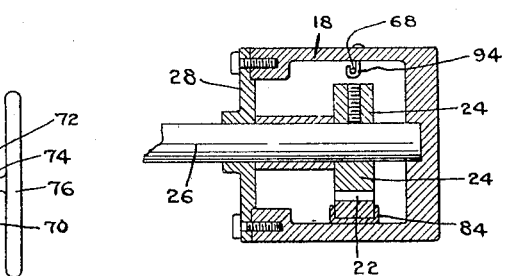
FIG-6.
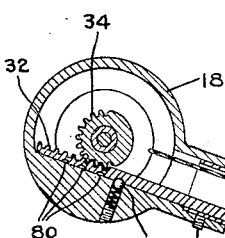
FIG-7
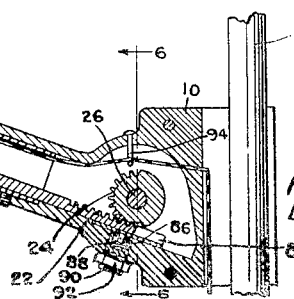
INVENTOR:
FRANK J. MACK.
BY Whiteley and
Ruckman
ATTORNEYS.

Patented Sept. 30, 1924.

1,509,968

UNITED STATES PATENT OFFICE.

FRANK J. MACK, OF MINNEAPOLIS, MINNESOTA, ASSIGNOR TO MACK MANUFACTURING COMPANY, INCORPORATED, OF MINNEAPOLIS, MINNESOTA, A CORPORATION.

VISIBLE SIGNAL FOR MOTOR VEHICLES.

Application filed May 4, 1922. Serial No. 558,340.

*To all whom it may concern:*

Be it known that I, FRANK J. MACK, a citizen of the United States, residing at Minneapolis, in the county of Hennepin and State of Minnesota, have invented certain new and useful Improvements in Visible Signals for Motor Vehicles, of which the following is a specification.

My invention relates to visible signals for motor vehicles. An object is to provide a signal which will be visible at night as well as in the day time, and which may be readily operated by the driver to indicate the direction in which he intends to turn and which may also be used as a parking light.

The full objects and advantages of my invention will appear in connection with the detailed description, and the novel features embodied in my inventive idea will be particularly pointed out in the claims.

In the accompanying drawings which illustrate an embodiment of my invention,—

Fig. 1 is a rear elevational view of the device showing it secured to a windshield post of a motor vehicle. Fig. 2 is a top plan view of the device with the wind shield post appearing in section. Fig. 3 is a view showing a wiring diagram. Fig. 4 is a view in vertical section on the line 4—4 of Fig. 1. Fig. 5 is an enlarged view in section on the line 5—5 of Fig. 4. Fig. 6 is a view in section on the line 6—6 of Fig. 7. Fig. 7 is a view in section on the line 7—7 of Fig. 2.

Referring to the construction shown in the drawings, a support 10 is secured by clips 12 to a windshield post P. The support 10 is hollow and receives the inner end of an outwardly extending sleeve 14 which as shown in Fig. 7 is held in a socket portion of the support by a set screw 16. Rigidly secured to the outer end of the sleeve 14 by a set screw 17 is a cup-shaped member 18. Slidably mounted in the sleeve 14 is a bar 20 on the inner end of which is a rack with which meshes a pinion 24 secured on the front end of a shaft 26 which is held rotatably in the support 10 by a plate 28 secured thereto. Secured to the rear end of the shaft 26 is a handle 30 which, as will be seen from Figs. 1 and 2, is within easy reach of the driver on account of the inward inclination of the shaft 26. On the outer end of the bar 20 and located within the cup member 18 is a rack portion 32 with which meshes a pinion 34 having teeth for a portion only of its circumference. The pinion 34 is secured to a shaft 36 rotatably mounted in a bearing formed in a disk 38 attached to and enclosing the rear of the cup member 18. A screw 40 passing through the disk 38 and extending axially into the shaft 36 serves to hold the latter rotatably in place. Secured to the front end of the shaft 36 is a second cup member 42, the periphery of which rotatably engages the periphery of the cup member 18. Secured to and extending from one side of the cup member 42 is a hollow arm 44 while attached diametrically opposite to this cup member is a balancing weight 46. Secured to the outer end of the arm 44 is a casing 48, the front and rear portions 50 and 52 consisting of transparent windows which may be of any desired color. Within the casing 48 is a socket 54 which holds an electric bulb 56. Insulatively mounted upon the front portion of the cup member 18 is a contact ring 58 having a gap 60 in its periphery at the upper side thereof. Secured in the cup member 42 at the base of the arm 44 is a block 62 of insulating material in which is mounted a resilient contact finger 64 which engages the contact ring 58 in all positions of the arm 44 except its upright position, in which case the finger is located at the gap 60. A wire 66 connects the finger 64 with one terminal of the lamp filament while the other terminal thereof is connected to the metal of the lamp socket which in turn connects with the metal framework so that a ground is obtained as indicated at G in Fig. 3. Secured to the contact ring 58 is an insulated wire 68 which passes through the sleeve 14 and out through the support 10 to a battery B which has a switch S associated therewith. When this switch is closed, a circuit through the lamp is completed for all positions of the indicating arm 44 except the upright position since the connection at one side of the switch is grounded as indicated at G'. The cover disk 38 is provided with a cylindrical exteriorly threaded projection 70 which receives a screw threaded cap 72 which when turned down frictionally holds a ball 74 to which a mirror 76 is attached. As shown in Fig. 7 the underside of the cup member 18 has an opening which receives a spring pressed ball 78 adapted to fit into any one of four depressions 80 formed in the under side of the rack bar 20. The ball 78 thus serves to hold the arm 44 in any one of the four indicating positions into which it may be moved. The rack bar 20 is prevented from moving beyond the desired positions in either direction on account of the fact that the pinion 34 has teeth on only a portion of its periphery and when the rack bar reaches either end of its movement, the blank portion of the pinion comes into engagement with the bar. This rack bar 20 as shown in Fig. 7 is made in two parts connected together by screw-threading their adjacent ends into a coupling 82. This permits one part to be twisted or turned relatively to the other to accommodate the device for different inclinations of the windshield posts.

The operation and advantages of my invention will now be readily understood. The neutral position of the arm 44 is shown in full lines at $a$ in Fig. 1 extending upwardly. When the arm is in this position the lamp is not lit since the contact finger 64 is at the gap 60 of the contact ring 58. When the driver wishes to employ the arm 44 and the lamp 56 carried thereby for indicating purposes, this may be effected by means of the handle 30 and the operating connections previously described, thereby bringing the arm into different positions as shown in Fig. 1. For instance, the arm when in position $b$ indicates a right turn, when in position $c$ a left turn, and when in position $d$ may be used for parking purposes. In case of the three last mentioned positions, the lamp will be lit. At the outer end of the bar 20, the rack portion is held up resiliently to the pinion 34 by means of the spring-pressed ball 78. At the inner end of the bar 20 as shown in Fig. 7, the rack portion is held up resiliently to the pinion 24 by the following device. A channel guide member 84 is placed within the support 10, the channel of this member slidably receiving the bar 20. A stem 86 extends down from the underside of the member 84 into an opening in the support 10, and this stem is surrounded by a coiled spring 88 which is received in a socket in the upper end of a screw plug 90 threaded into the opening in the support. A lock nut 92 on the lower end of the screw plug holds the latter in proper adjusted position. An eye 94 within the upper portion of the support 10 keeps the wire 68 from coming into contact with the pinion 24.

I claim:

1. A signal for motor vehicles comprising a support adapted to be secured to a windshield post of the vehicle, a sleeve secured to said support so as to extend outwardly therefrom, a bearing member secured to the outer end of said sleeve, a shaft rotatably mounted in said bearing member, an indicating arm secured to the outer end of said shaft, a pinion secured to the inner end of said shaft, a bar slidably mounted in said sleeve and having a rack portion on its outer end in mesh with said pinion, a spring pressed ball mounted in said bearing member, and adapted to engage in any one of a number of depressions in said outer end for holding said indicating arm in different positions into which it is moved, an operating shaft rotatably mounted in said support, a pinion on the inner end of said operating shaft in mesh with a rack portion on the inner end of said bar, and a handle on the outer end of said operating shaft.

2. A signal for motor vehicles comprising a support adapted to be secured to a windshield post of the vehicle, a sleeve secured to said support so as to extend outwardly therefrom, a bearing member secured to the outer end of said sleeve, a shaft rotatably mounted in said bearing member, an indicating arm secured to the outer end of said shaft, a bar slidably mounted in said sleeve and having a rack portion on its outer end in mesh with said pinion, means carried by said bearing member for resiliently supporting said outer end, an operating shaft rotatably mounted in said support, a pinion on the inner end of said operating shaft in mesh with a rack portion on the inner end of said bar, means carried by said support for resiliently supporting said inner end, and a handle on the outer end of said operating shaft.

In testimony whereof I hereunto affix my signature.

FRANK J. MACK.